United States Patent
Kim

(10) Patent No.: US 8,964,139 B2
(45) Date of Patent: *Feb. 24, 2015

(54) MULTIFUNCTIONAL OPTICAL FILTER FOR STEREOSCOPIC DISPLAY DEVICE AND STEREOSCOPIC DISPLAY DEVICE COMPRISING THE SAME

(71) Applicant: LG Chem, Ltd., Seoul (KR)

(72) Inventor: Joon-Hyung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,542

(22) Filed: Feb. 26, 2014

(65) Prior Publication Data

US 2014/0177048 A1 Jun. 26, 2014

Related U.S. Application Data

(63) Continuation of application No. 13/814,034, filed as application No. PCT/KR2011/006136 on Aug. 19, 2011, now Pat. No. 8,810,743.

(30) Foreign Application Priority Data

Aug. 20, 2010 (KR) .................. 10-2010-0081047
Aug. 18, 2011 (KR) .................. 10-2011-0082354

(51) Int. Cl.
*G02F 1/1335* (2006.01)
*G02B 27/26* (2006.01)
*G02F 1/13* (2006.01)
(Continued)

(52) U.S. Cl.
CPC .............. *G02B 27/26* (2013.01); *G02F 1/1313* (2013.01); *G02B 5/201* (2013.01); *H04N 13/0422* (2013.01); *H04N 13/0434* (2013.01)
USPC .............. 349/15; 349/104; 349/106; 359/465

(58) Field of Classification Search
CPC ............ G02F 1/1313; G02F 1/133514; G02F 1/13363; G02B 27/26; G02B 5/201; H04N 13/0422; H04N 13/0434
USPC ..................... 349/15, 96, 104, 106, 117, 122; 359/462, 465, 489.07; 348/58
See application file for complete search history.

(56) References Cited

U.S. PATENT DOCUMENTS

| | | | |
|---|---|---|---|
| 6,046,787 | A | 4/2000 | Nishiguchi |
| 6,084,647 | A | 7/2000 | Hatano et al. |
| 6,703,989 | B1 | 3/2004 | Harrold et al. |
| 6,961,177 | B2 | 11/2005 | Sato et al. |
| 8,134,779 | B2 | 3/2012 | Roh et al. |

(Continued)

FOREIGN PATENT DOCUMENTS

| | | |
|---|---|---|
| JP | 06-034969 A | 2/1994 |
| JP | 9-265071 A | 10/1997 |

(Continued)

*Primary Examiner* — Dung Nguyen
*Assistant Examiner* — Tai Duong
(74) *Attorney, Agent, or Firm* — McKenna Long & Aldridge, LLP

(57) ABSTRACT

Provided are a multifunctional optical filter for a stereoscopic display device and a stereoscopic display device including the same. The multifunctional optical filter includes a 3D filter layer patterned into a first region adjusting a polarization state of a right-eye image and a second region adjusting a polarization state of a left-eye image, and a color filter layer having a RGB pattern, wherein the RGB pattern of the color filter layer and the pattern of the 3D filter layer are formed to correspond to each other.

5 Claims, 5 Drawing Sheets

(51) Int. Cl.
 *G02B 5/20* (2006.01)
 *H04N 13/04* (2006.01)

(56) References Cited

U.S. PATENT DOCUMENTS

| | | |
|---|---|---|
| 2004/0201888 A1 | 10/2004 | Hagita |
| 2007/0195228 A1* | 8/2007 | Tanaka et al. ................... 349/96 |
| 2008/0149930 A1* | 6/2008 | Lee et al. ......................... 257/59 |
| 2008/0170183 A1 | 7/2008 | Sugiyama |
| 2008/0304151 A1 | 12/2008 | Ura |
| 2011/0059263 A1 | 3/2011 | Akao |
| 2012/0133871 A1 | 5/2012 | Saigusa |

FOREIGN PATENT DOCUMENTS

| | | |
|---|---|---|
| JP | 10-227998 A | 8/1998 |
| JP | 10-239641 A | 9/1998 |
| JP | 10-253824 A | 9/1998 |
| JP | 10153771 | 9/1998 |
| JP | 200375773 | 3/2003 |
| JP | 2004101714 | 2/2004 |
| JP | 2004-170693 A | 6/2004 |
| JP | 2008-175857 A | 7/2008 |
| JP | 2008-225437 A | 9/2008 |
| JP | 2009301039 | 12/2009 |
| JP | 2011-075817 A | 4/2011 |
| JP | 2012-022148 A | 2/2012 |
| KR | 1020090027056 | 3/2009 |
| KR | 1020100006461 | 1/2010 |
| TW | I256491 B | 6/2006 |
| TW | 200905245 A | 2/2009 |
| TW | 200907225 A | 2/2010 |
| WO | 2010-150693 A1 | 12/2010 |

\* cited by examiner

MULTIFUNCTIONAL OPTICAL FILTER FOR STEREOSCOPIC DISPLAY DEVICE AND STEREOSCOPIC DISPLAY DEVICE COMPRISING THE SAME

This application is a continuation of and claims the benefit of U.S. application Ser. No. 13/814,034, filed Feb. 4, 2013, which is a National Stage Application of PCT/KR2011/006136, which claims the benefit of Korean Patent Application No. 10-2010-0081047, file Aug. 20, 2010 and Korean Patent Application No. 10-2011-0082354, filed Aug. 18, 2011, all of which are incorporated by reference in their entirety herein.

TECHNICAL FIELD

The present invention relates to an optical filter for a stereoscopic display device and a stereoscopic display device including the same, and more particularly, to a multifunctional optical filter for a stereoscopic display device for performing a color filtering function and a three-dimensional filtering function through only a single filter and a stereoscopic display device including the same.

BACKGROUND ART

A stereoscopic display device is a new concept for an image display device for improving a quality level of visual information by providing a three-dimensional image similar to an actual image, which, to an observer, looks and feels quite different to a related art two-dimensional image. In general, the reason for which people experience a three-dimensional visual effect is well known, in that when people view an object, there is a time difference between images striking the right and left eyes. That is, since people's eyes are spaced apart from each other by about 65 mm, images from slightly different directions reach them, so that a three-dimensional effect is realized due to binocular disparity caused when stereoscopic images are displayed. As a result of this, stereoscopic images may be realized through a method of displaying images having a time difference to both of an observer's eyes.

A related art stereoscopic display device is largely classified into a display device with a pair of polarized glasses and a display device without polarized glasses. A stereoscopic display device using a pair of polarized glasses projects left- and right-eye images having different respective polarization properties which allow only a left-eye image to be projected onto a left-eye lens and only a right-eye image to be projected onto a right-eye lens through polarizing plates attached to the pair of polarized glasses, thereby providing a stereoscopic visual effect. This technique of using a pair of glasses requires a user to wear inconvenient polarized glasses, but has less viewing angle limitations and demands relatively simple manufacturing processes.

In general, a related art stereoscopic display device using a pair of polarized glasses includes an image generating unit, which includes a left-eye image unit for generating a left-eye image and a right-eye image unit for generating a right-eye image, and a filter unit, which alters polarization states of left-eye image light and right-eye image light generated from the image displaying unit.

At this point, the image generating unit may include a display panel such as a Liquid Crystal Display (LCD) and a Plasma Display Panel (PDP). For example, the image displaying unit includes a Thin Film Transistor (TFT)-array substrate, which includes a transistor and a pixel electrode, a color filter substrate, which includes a transparent electrode and a color filter layer, and liquid crystal cells, which are arranged two-dimensionally in a parallel direction or a vertical direction.

Furthermore, the filter unit includes a polarizing film, or a polarizing plate having a phase difference plate attached, all of which are patterned in correspondence to the left-eye image display unit and the right-eye image display unit, respectively. The filter unit is typically attached to an external color filter substrate.

However, in the case of the related art stereoscopic display device, since there is a thick glass substrate between an optical filter and a color filter layer of an image display unit, right-eye image light and left-eye image light from the image display unit are projected into respective opposite eyes, thereby causing crosstalk. As a result of this, it becomes difficult to obtain a clear three-dimensional image.

In addition, it is important to accurately position the pixels of an image display unit and the pattern of an optical filter in a stereoscopic image display device. However, when the pixels of the image display unit do not correspond to the pattern of the optical filter, right-eye image light and left-eye image light are not properly separated so that three-dimensional images may not be accurately obtained. Furthermore, in relation to the related art stereoscopic display device, it is difficult to precisely match the pixels of an image display unit and the pattern of an optical filter.

DISCLOSURE

Technical Problem

An aspect of the present invention provides an optical filter for a stereoscopic display device for reducing crosstalk and preventing quality deterioration due to the mismatch of pixels and a pattern of the optical filter and a stereoscopic display device including the same.

Technical Solution

According to an aspect of the present invention, there is provided a multifunctional optical filter for a stereoscopic display device including: a 3D filter layer patterned into a first region adjusting a polarization state of a right-eye image and a second region adjusting a polarization state of a left-eye image; and a color filter layer having a RGB pattern, wherein the RGB pattern of the color filter layer and the pattern of the 3D filter layer are formed to correspond to each other.

The multifunctional optical filter for a stereoscopic display device may be attached to an outer side of a display panel in a stereoscopic display device.

The multifunctional optical filter for a stereoscopic display device may further include an adhesive layer between the 3D filter layer and the color filter layer.

The multifunctional optical filter for a stereoscopic display device may further include an adhesive layer on the uppermost layer of the optical filter.

The color filter layer may be formed through a printing method or a photolithography method.

The color filter layer may be formed through an inkjet printing method or a gravure printing method.

According to another aspect of the present invention, there is provided a stereoscopic display device comprising the multifunctional optical filter for a stereoscopic display device.

According to another aspect of the present invention, there is provided a stereoscopic display device including: an image generating unit comprising an upper substrate having a transparent electrode on one side thereof, a lower substrate spaced apart from the upper substrate and having a transparent electrode on one side thereof, and a liquid crystal cell interposed between the upper substrate and the lower substrate; and an optical filter comprising a 3D filter layer patterned into a first region adjusting a polarization state of a right-eye image and a second region adjusting a polarization state of a left-eye image and a color filter layer having a RGB pattern, the optical filter being disposed at an outer side of the upper substrate.

Advantageous Effects

An optical filter of the present invention performs a color filtering function and a three-dimensional filtering function through only one filter. Therefore, no color filter is required on a substrate in an image generating unit when the optical filter of the present invention is used.

Moreover, in a case of the optical filter of the present invention, since a color filter and a three-dimensional filter are integrated into a single body, crosstalk may be effectively reduced due to a short distance between pixels and a three-dimensional filter.

Furthermore, according to the present invention, since the RGB pattern of a color filter is directly formed on the pattern of a three-dimensional filter, the RGB pattern and the pattern of the three-dimensional filter are accurately formed to correspond to each other. Consequently, a high quality three-dimensional image can be achieved.

In addition, the optical filter of the present invention is disposed on an outer side of a substrate in an image generating unit (that is, a display panel).

DESCRIPTION OF DRAWINGS

The above and other aspects, features and other advantages of the present invention will be more clearly understood from the following detailed description taken in conjunction with the accompanying drawings, in which.

BEST MODE

Exemplary embodiments of the present invention will now be described in detail with reference to the accompanying drawings.

FIGS. 1 to 5 are views illustrating multifunctional optical filters for a stereoscopic display device according to embodiments of the present invention.

As shown in FIGS. 1 to 5, the optical filter of the present invention includes a 3D filter layer 100 and a color filter layer 200.

The 3D filter layer 100 is used to realize a stereoscopic image by changing polarization states of right-eye image light and left-eye image light. The 3D filter layer 100 includes a first region 110 for adjusting a polarization state of the right-eye image light and a second region 120 for adjusting a polarization state of the left-eye image light. For example, the 3D filter layer 100 includes a retardation film, which is patterned to allow the first region and the second region to have different respective phase difference values. At this point, the pattern of the 3D filter layer 100 may be striped or a grid shaped, but is not limited thereto.

For example, the 3D filter layer 100 includes forming a patterned liquid crystal alignment layer on a base film, coating a liquid crystal thereon, hardening it with ultraviolet rays to fix an alignment of the liquid crystal, and adjusting a polarization state. At this point, patterning the alignment layer may be performed through various methods. For example, one method includes alternately forming different respective liquid alignment layers in certain portions corresponding to the first region and the second region. Another method includes forming an alignment layer on an entire surface of a base film and forming another alignment layer overlapping on a portion corresponding to the second region on the alignment layer. Another method includes forming an alignment layer on an entire surface of a base film and projecting polarized light in different respective directions to the first region and the second region by using a photomask. A liquid crystal is aligned on the patterned alignment layer formed through the above methods, so as to realize the first region and the second region having different respective alignment directions.

Next, the color filter layer 200 serves to realize a color image and includes a RGB pattern. At this point, the RGB pattern of the color filter layer 200 is formed to correspond to the pattern of the 3D filter layer 100.

For example, the color filter layer 200 may be manufactured through a photolithography method using a color photosensitive material or a printing method. If the printing method is used, it may include an inkjet printing method or a gravure printing method.

Figure 1:
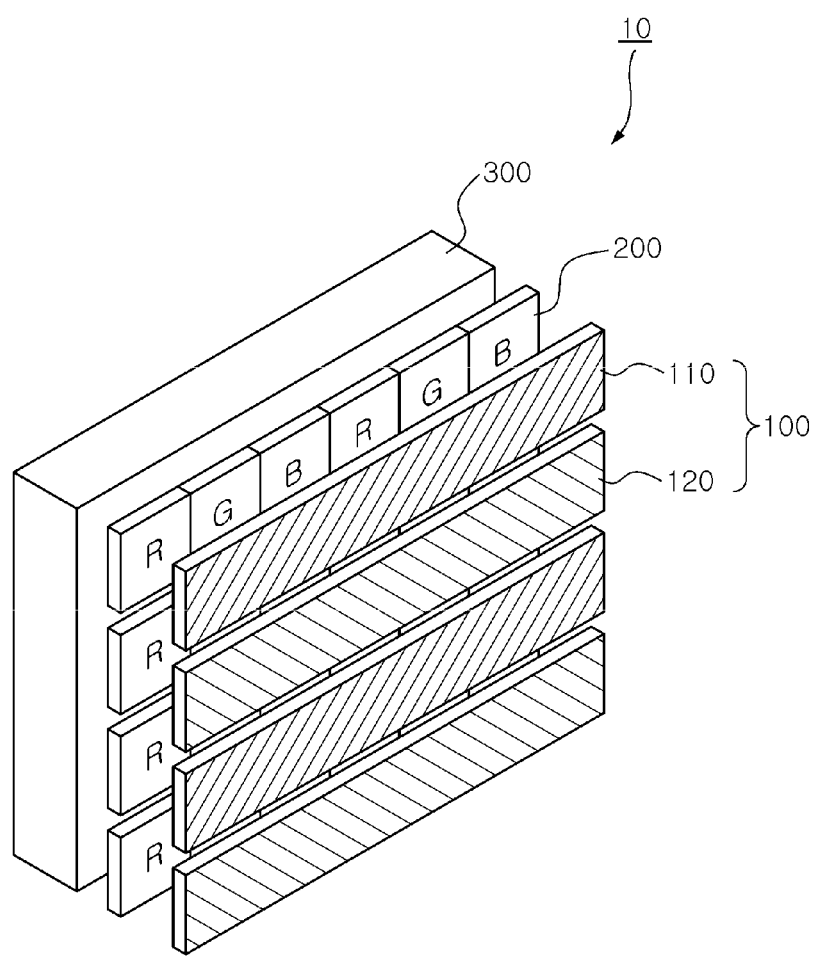
FIGS. 1 to 5 are views illustrating multifunctional optical filters for a stereoscopic display device according to embodiments of the present invention.
Figure 2:
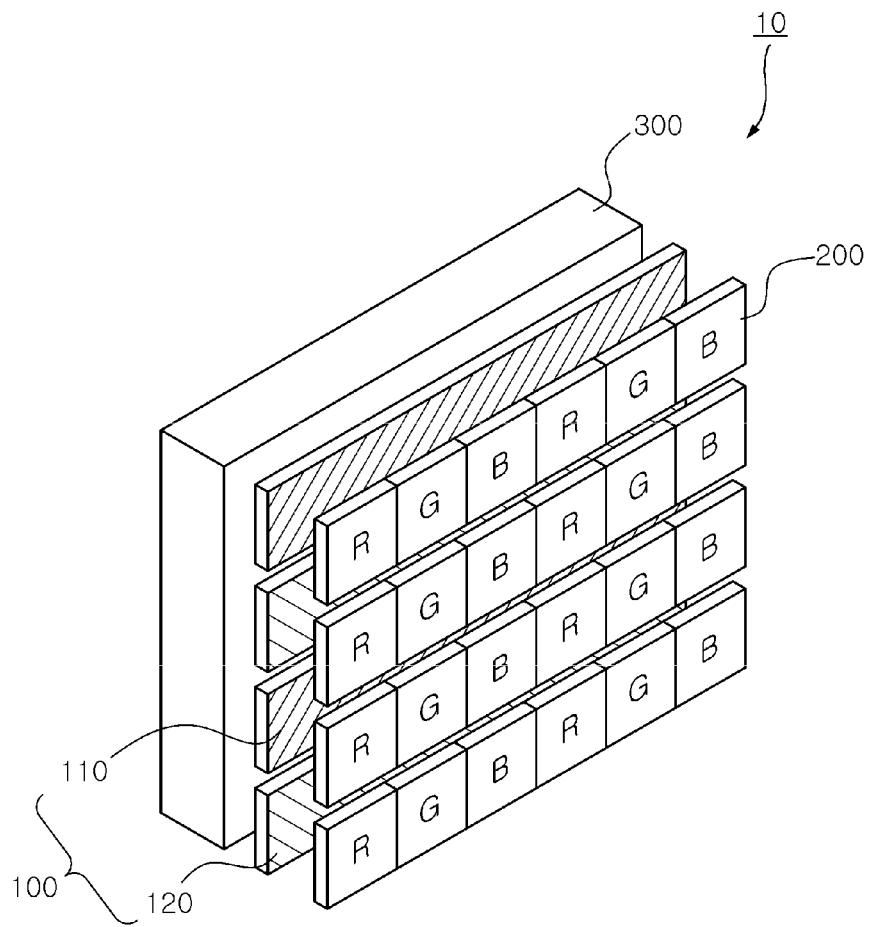

Meanwhile, according to the present invention, the 3D filter layer 100 and the color filter layer 200 may be stacked on a base film 300. At this point, their stacking order may vary. That is, as shown in FIG. 1, the color filter layer 200 may be formed first on the base film 300 and then the 3D filter layer 100 may be formed thereon. As shown in FIG. 2, the 3D filter layer 100 and the color filter layer 200 may be sequentially formed on the base film 300.

Figure 5:
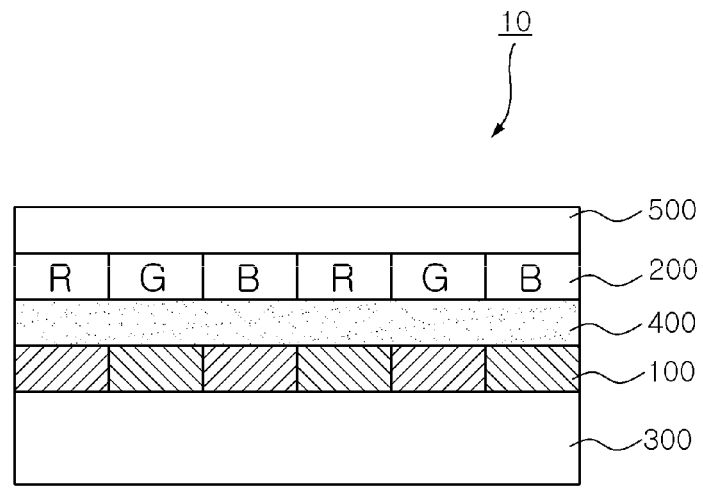

Moreover, as shown in FIG. 5, the optical filter of the present invention may be manufactured through a method including forming the 3D filter layer 100 on the base film 300, forming the color filter layer 200 on another base film 500, and bonding the two base films 300 and 500 with an adhesive layer 400, besides a method of sequentially stacking the 3D filter layer 100 and the color filter layer 200 on one base film.

The base films 300 and 500 may be made of a film having excellent light transmittance but are not especially limited thereto. For example, the base films 300 and 500 may include a trichloroacetate film, a polyethylene terephthalate film, a cycloolefin copolymer film, a polyethylene naphthalate film, a celluose acetate film, a cellulose butyrate film, a cellulose propionate film, an ethyl cellulose film, an acrylic film, a polyvinyl alcohol film, and a polyethylene film.

Figure 3:
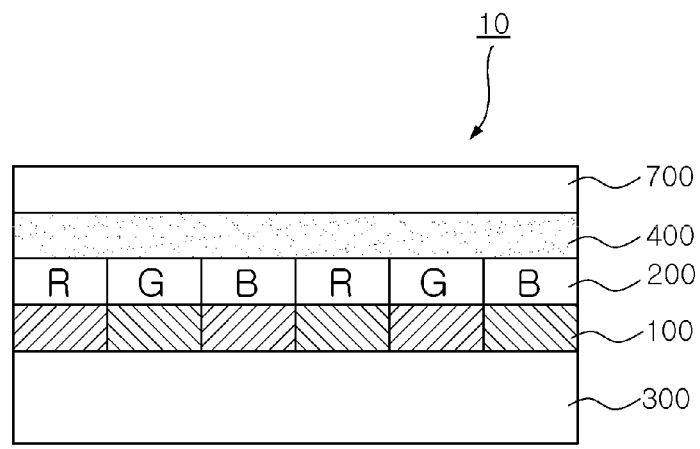
Figure 4:
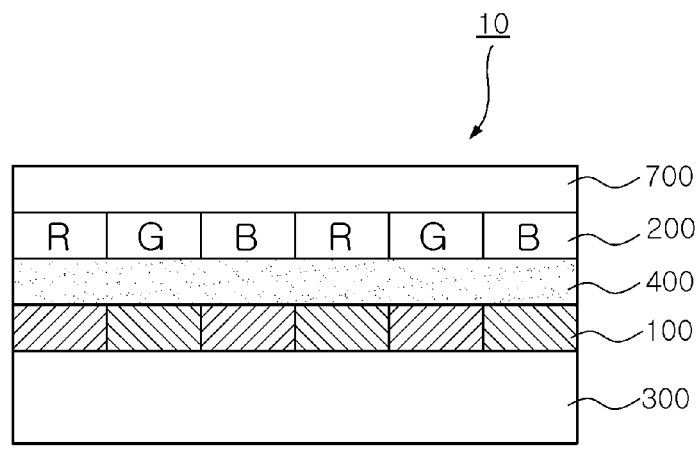

Meanwhile, the optical filter may further include an adhesive layer 400 in addition to the 3D filter layer 100 and the color filter layer 200. The adhesive layer 400 may be disposed on the uppermost layer of the optical filter as shown in FIG. 3 and may be disposed between the 3D filter layer 100 and the color filter layer 200 as shown in FIG. 4.

When the adhesive layer 400 is formed on the uppermost layer of the optical filter, it is used to attach the optical filter to a display device. The adhesive layer 400 may include an acrylic adhesive, a rubber adhesive, and a silicon adhesive but an acrylic adhesive having excellent light transmittance may preferably be used for the adhesive layer 400. Additionally, in this case, a release film 700 may be additionally attached to the adhesive layer 400 in order to prevent foreign substance attachment. The release film 700 is removed when the optical filter is attached to the display device. Then, the optical filter is attached to the display device. When the adhesive layer 400 is formed, since the optical filter is detachable from the surface of the display device, the color filter layer 200 or the 3D filter layer 100 may be easily replaceable in the event it is damaged or malfunctions.

Moreover, after the adhesive layer 400 is formed, if the color filter layer 200 is formed through an inkjet printing method, a color filter pattern is printed on the adhesive layer 400. The adhesive layer 400 serves as an ink reception layer, thereby improving ink dyeing power.

Meanwhile, a thickness of the adhesive layer 400 may be from about 5 μm to about 30 μm. If a thickness of the adhesive layer 400 is less than about 5 μm, accurate coating may be difficult and, if a thickness of the adhesive layer 400 is more than about 30 μm, an amount of an adhesive used may be increased.

When the optical filter of the present invention is used, since the distance between the RGB pixels of the color filter layer 200 and the 3D filter layer 100 is relatively short, crosstalk is greatly reduced. Additionally, in a case of the optical filter of the present invention, since the color filter layer 200 and the 3D filter layer 100 are integrated into a single body, the RGB pattern and the 3D filter pattern may be formed to accurately correspond to each other and, as a result of this, a high quality 3D image may be realized.

Meanwhile, the optical filter of the present invention may be attached to an outer side of a display panel in an image display device. Here, the display panel serves to generate a stereoscopic image. When the optical filter is disposed on the outer side of the display panel for generating a stereoscopic image, a panel formed of a glass material is manufactured and then a process for attaching the optical filter to the outer side of the display panel is performed. Thus, since a typical high temperature process of more than about 200° C. used for an LCD panel manufacturing process or a typical high temperature process of more than about 500° C. used for a PDP manufacturing process is not performed, a film having a thermal resistance to more than about 200° C. is not used but a typical film is used. The typical film may include a trichloro-acetate film, a polyethylene terephthalate film, a cycloolefin copolymer film, a polyethylene naphthalate film, a celluose acetate film, a cellulose butyrate film, a cellulose propionate film, an ethyl cellulose film, an acrylic film, a polyvinyl alcohol film, and a polyethylene film. These films are superior to a high-temperature-resistant polyimide film in aspects of transparency, pigmentation, and cost. Additionally, a liquid crystal alignment layer used for a 3D filter layer or a pigmentation layer used for a color filter layer may be formed of a material having a low heat resistance. Moreover, since the optical filter of the present invention may be detachable from the substrate of the stereoscopic display device, when a defect or damage occurs in the color filter layer or the 3D filter layer, the optical filter may be easily repaired or replaceable, thereby facilitating manufacturing processes.

In another aspect of the present invention, a stereoscopic display device including the optical filter is provided. In more detail, the stereoscopic display device of the present invention includes an image generating unit for generating an image light and an optical filter.

At this point, the optical filter is the same as above. The image generating unit may generate left-eye image light and right-eye image light and may be a typical display panel such as an LCD panel or a PDP panel. However, according to the present invention, since the optical filter includes a color filter, no color filter is required on the substrate of the display panel.

Figure 6:
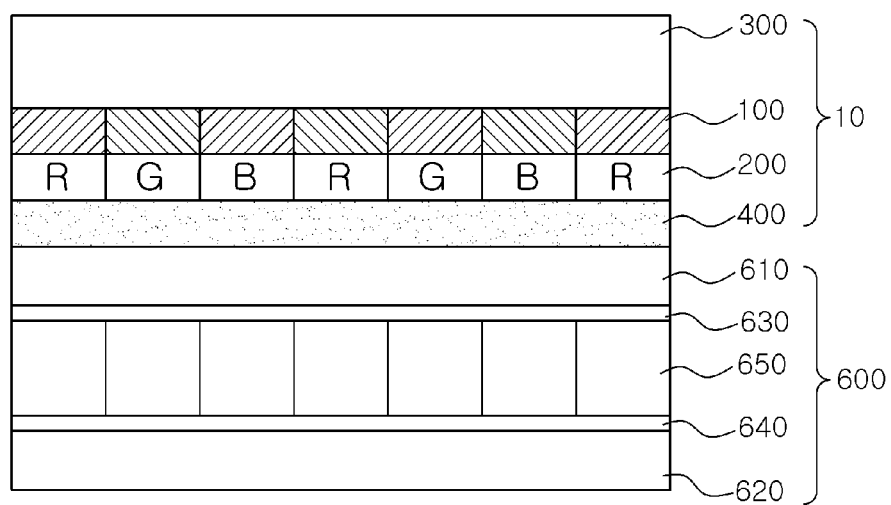
FIG. 6 is a view of a stereoscopic display device according to an embodiment of the present invention.

FIG. 6 is a view of a stereoscopic display device according to an embodiment of the present invention.

As shown in FIG. 6, the stereoscopic display device of the present invention includes an upper substrate 610, a lower substrate 620, an image generating unit 600 formed of a liquid crystal cell 650 interposed between the upper substrate 610 and the lower substrate 620, and an optical filter 10 disposed at the outer side of the upper substrate 610 in the image generating unit.

At this point, the upper substrate 610 and the lower substrate 620 may be formed of a material having excellent light transparency and, for example, may be include a glass or plastic substrate. Additionally, transparent electrodes 630 and 640 for applying power to the liquid crystal cell 650 are formed on facing surfaces of the upper substrate 610 and the lower substrate 620.

The liquid crystal cell 650 serves to represent an on/off state and a grey state of a pixel by adjusting the transmittance of a polarized light and may have the same structure as a typical LCD device.

Meanwhile, the optical filter 10 is disposed on the outer side of the upper substrate 610 and includes a 3D filter layer 100, which is patterned into a first region 110 for adjusting a polarization state of a right-eye image and a second region 120 for adjusting a polarization state of a left-eye image, and a color filter layer 200 having a RGB pattern. Since detailed descriptions of the optical filter 10 are described above, overlapping descriptions will be omitted.

MODE FOR INVENTION

Hereinafter, the present invention will be described in more detail according to embodiments of the present invention.

Embodiment 1

After a first alignment layer was comprehensively applied to a trichloro-acetate film, +45° polarized UV light was projected onto the result to harden the first alignment layer. Then, a second alignment layer was applied to the first alignment layer in a parallel line shape and −45° polarized UV light was projected onto the result to harden the second alignment layer. Next, a liquid crystal was coated on the result to harden it so that a 3D filter layer having a parallel line shape was formed.

An acrylic adhesive was uniformly applied to the 3D filter layer with a 20 μm thickness to form an adhesive layer.

A color ink was applied to the adhesive layer through an inkjet method to be aligned orthogonal to the lines of the 3D filter layer and the result was dried to form a color filter layer. As a result of this, an optical filter was finally manufactured.

After a release film was removed from the optical film, the optical film was attached to an LCD device to manufacture a stereoscopic display device.

Embodiment 2

In the same manner as embodiment 1, after a 3D filter layer in a parallel line shape was formed on a trichloro-acetate film, a color ink was applied to be aligned orthogonal to the lines of the 3D filter layer through a gravure printing machine and was then dried to form a color filter layer.

An acrylic adhesive was uniformly applied to the color filter layer with a 20 μm thickness and then a release film was attached thereon to manufacture an optical filter.

After the release film was removed from the optical filter, the optical filter was attached to an LCD device to manufacture a stereoscopic display device.

Embodiment 3

Except that a photolithography method was used to form a color filter, embodiment 3 uses the same method as embodiment 2.

Embodiment 4

In the same manner as embodiment 1, a 3D filter layer in a parallel line shape was formed on a trichloro-acetate film.

An acrylic adhesive was uniformly applied to a polyethylene terephthalate film with a 20 μm thickness and a color ink is applied through an inkjet method on the adhesive layer to be aligned orthogonal to the lines of the 3D filter layer and was then dried, in order to form a color filter layer.

After the trichloro-acetate film having the 3D filter layer and the polyethylene terephthalate film having the color filter layer were laminated, an adhesive was coated on the outer side of the polyethylene terephthalate film and a release film was attached thereon to manufacture an optical filter.

After the release film was removed from the optical filter, the optical filter was attached to an LCD device to manufacture a stereoscopic display device.

Embodiment 5

Except that a color filter layer was formed on a cycloolefin copolymer film, a stereoscopic display device was manufactured through the same method as the embodiment 4.

Comparative Example

A single 3D filter, which was not integrated with a color filter, was mounted on the external surface of an available LCD panel having a color filter between an upper substrate and a transparent electrode, in order to manufacture a stereoscopic display device.

Crosstalk rates were measured from the stereoscopic display devices of embodiments 1 to 5 and the comparative example.

<Measurement Conditions>
Pixel pitch: about 0.54 mm
Glass thickness: about 0.63 mm
multifunctional filter thickness: about 0.2 mm
Observation distance: about 1500 mm
Crosstalk rate $XT(\theta)$ defined as the following Equation (1).

$$XT(\theta)=(XT_L(\theta)+XT_R(\theta))/2 \quad \text{Equation (1):}$$

Moreover, in Equation (1), $XT_L(\theta)$ and $XT_R(\theta)$ are defined as the following Equations (2) and (3).

$$XT_L(\theta)=(R_L(\theta)-B_L(\theta))/(L_L(\theta)-B_L(\theta))\times 100\% \quad \text{Equation (2):}$$

$$XT_R(\theta)=(L_R(\theta)-B_R(\theta))/(R_R(\theta)-B_R(\theta))\times 100\% \quad \text{Equation (3):}$$

Where $B_L$ represents brightness when all pixels realizing right-eye image light and left-eye image light are in a black mode and the left-eye image light is observed at a viewing angle θ through a left-eye lens unit of polarized glasses, $L_L$ is brightness when a pixel realizing right-eye image light is in a black mode, a pixel realizing left-eye image light is in a white mode, and the left-eye image light is observed at a viewing angle θ through a left-eye lens unit of polarized glasses, $R_L$ is brightness when a pixel realizing right-eye image light is in a white mode, a pixel realizing left-eye image light is in a black mode, and the left-eye image light is observed at a viewing angle θ through a left-eye lens unit of polarized glasses, $B_R$ represent brightness when all pixels realizing right-eye image light and left-eye image light are in a black mode and the right-eye image light are observed at a viewing angle θ through a right-eye lens unit of polarized glasses, $L_R$ is brightness when a pixel realizing right-eye image light is in a black mode, a pixel realizing left-eye image light is in a white mode, and the right-eye image light is observed at a viewing angle θ through a right-eye lens unit of polarized glasses, and $R_R$ is brightness when a pixel realizing right-eye image light is in a white mode, a pixel realizing left-eye image light is in a black mode, and the right-eye image light is observed at a viewing angle θ through a right-eye lens unit of polarized glasses.

Figure 7:
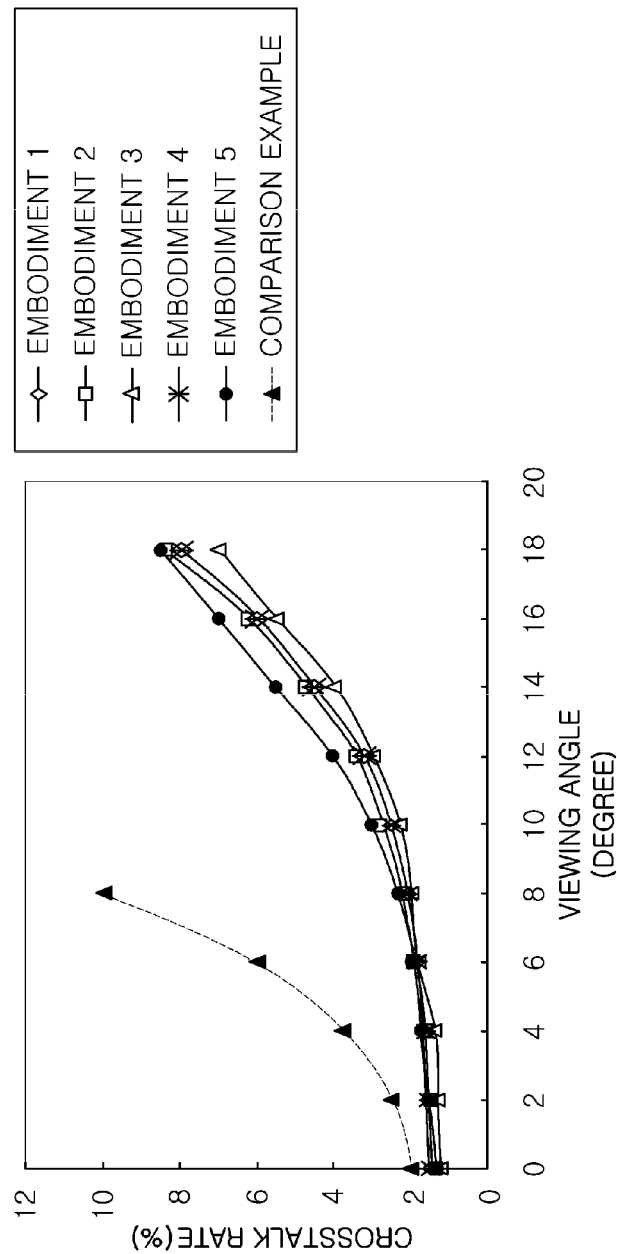
FIG. 7 is a graph illustrating measured crosstalk rates.

FIG. 7 is a graph illustrating measured crosstalk rates. The measured values of the embodiments 1 to 5 show the same level within a measurement error. Through FIG. 7, it is shown that the crosstalk rates of the embodiments 1 to 5 are significantly lower than that of the comparison example.

While the present invention has been shown and described in connection with the exemplary embodiments, it will be apparent to those skilled in the art that modifications and variations can be made without departing from the spirit and scope of the invention as defined by the appended claims.

SEQUENCE LIST TEXT

100: 3D filter layer
110: first region
120: second region
200: color filter layer
300, 500: base film
400: adhesive layer
610: upper substrate
620: lower substrate
630, 640: transparent electrode
650: liquid crystal cell
700: release film

The invention claimed is:

1. A stereoscopic display device comprising:
   a display panel; and
   a multifunctional optical filter for a stereoscopic display device, the multifunctional optical filter comprising:
   a 3D filter layer patterned into a first region for adjusting a polarization state of a right-eye image and a second region for adjusting a polarization state of a left-eye image; and
   a color filter layer having a RGB pattern,
   wherein the RGB pattern of the color filter layer and the pattern of the 3D filter layer are formed to correspond to each other, and
   wherein the optical filter is attached to an outer side of the display panel.

2. The stereoscopic display device of claim 1, further comprising an adhesive layer on the color filter layer of the optical filter.

3. The stereoscopic display device of claim 1, wherein the color filter layer is formed through a printing method.

4. The stereoscopic display device of claim 3, wherein the color filter layer is formed through an inkjet printing method or a gravure printing method.

5. The stereoscopic display device of claim 1, wherein the color filter layer is formed through a photolithography method.

* * * * *